United States Patent [19]

Ball

[11] 3,789,110

[45] Jan. 29, 1974

[54] METHOD FOR REMOVING SULFUR DIOXIDE FROM WASTE GASES AND RECOVERING A CONCENTRATED STREAM OF SULFURDIOXIDE

[75] Inventor: Frank J. Ball, Charleston, S.C.

[73] Assignee: Westvaco Corporation, New York, N.Y.

[22] Filed: July 23, 1971

[21] Appl. No.: 165,051

[52] U.S. Cl. ............................... 423/539, 423/244
[51] Int. Cl. ............................................ C01b 17/60
[58] Field of Search ........... 23/2 SQ, 177, 178, 226; 423/539, 244

[56] References Cited
UNITED STATES PATENTS

| | | | |
|---|---|---|---|
| 3,563,704 | 2/1971 | Torrence | 23/178 |
| 3,667,908 | 6/1972 | Torrence | 23/178 |
| 2,839,365 | 6/1958 | Murray | 23/178 |
| 2,539,579 | 1/1951 | Hecker | 23/177 |
| 3,495,941 | 2/1970 | Van Helden | 23/226 |

Primary Examiner—G. O. Peters
Attorney, Agent, or Firm—Ernest B. Lipscomb et al.

[57] ABSTRACT

A method of removing sulfur dioxide from waste gas mixtures comprising adsorbing sulfur dioxide onto activated carbon as sulfuric acid at a temperature between ambient temperature and 350° F., subsequently reacting the sulfuric acid laden activated carbon with the correct proportion of hydrogen sulfide at a temperature below 350° F., preferably 200°–350° F., to homogeneously reduce all the hydrogen sulfide and a portion of the adsorbed sulfuric acid to elemental sulfur, then raising the temperature to between 350° to 1000° F. to react the elemental sulfur and remaining sulfuric acid to form concentrated sulfur dioxide without reaction with the activated carbon, recovering said sulfur dioxide from the activated carbon, and recycling the completely regenerated activated carbon. The recovered sulfur dioxide may be used in a variety of ways, for instance, it may be reacted with methane to produce hydrogen sulfide, it may be reacted with hydrogen sulfide as in a Claus unit to produce elemental sulfur, or it may be converted to sulfuric acid.

10 Claims, 2 Drawing Figures

METHOD FOR REMOVING SULFUR DIOXIDE FROM WASTE GASES AND RECOVERING A CONCENTRATED STREAM OF SULFURDIOXIDE

BACKGROUND OF THE INVENTION

This invention relates to a process for removing low concentrations of sulfur dioxide from a waste gas stream and recovering a stream of concentrated sulfur dioxide. More specifically, this invention relates to adsorbing sulfur dioxide from a waste gas mixture onto an activated carbon as sulfuric acid, reacting a portion of said adsorbed sulfuric acid with hydrogen sulfide at a temperature below 350° F. and raising the temperature above 350° F. to form a concentrated stream of sulfur dioxide without carbon burn-off.

Many industrial plants employ fuels having a sulfur content higher than one percent, some as high as six-seven percent or more. These fuels primarily coal, fuel oil and petroleum coke, upon combustion form undesirable pollutants including sulfur oxides. Removal of these sulfur oxides from a flue gas stream has long been a troublesome problem. The advantages of this invention enable industrial plants to use high sulfur content fuels without fear of air pollution, as the sulfur dioxide is removed from the effluent gas. In addition, other industrial effluents, such as hydrogen sulfide waste gas streams, contribute to air pollution. Where these particularly troublesome pollutants are effluents, they also may be eliminated by incorporating into the process of this invention.

Another aspect of this invention is its applicability to oil refineries, and the two major sources of sulfur dioxide pollution that are found in refineries. These sources include the off gases from sulfur producing Claus units, and the flue gases of the power plants which produce electrical power for running the oil refinery. The Claus off gases contain predominantly $H_2S$ and $SO_2$, but also minor amounts COS, and $CS_2$, all of which are normally incinerated so that only $SO_2$ is admitted to the atmosphere as is the $SO_2$ laden power plant waste gas. By using the process of this invention both the sulfur dioxide stream from the power plant and the Claus off gas stream containing sulfur dioxide are combined for processing.

The removal of sulfur oxides from gas streams has been achieved by both chemical and physical methods using liquid or solid substances. The most successful of these combinations is to use a dry process which contacts adsorbent material with the gases to be cleaned. One difficulty in developing an economical process for sulfur oxide removal is that large volumes of gas containing low concentrations of sulfur oxides, i.e., on the order of 0.1 to 10.0 percent by volume must be quickly processed. In order to keep the adsorbent inventory at a minimum and the plant from being extensively large and costly, the adsorbent must have a high adsorbing efficiency of sulfur oxide compounds. Such adsorbents include activated carbon, especially bituminous coal-base activated carbons.

One dry activated carbon adsorbent process for removing sulfur oxides from gas streams is disclosed in U. S. Pat. No. 3,563,704 to Torrence. In the process disclosed in Torrence, sulfur dioxide is adsorbed onto activated carbon at a temperature between 200° and 350° F. in the form of sulfuric acid, as is well known in the art according to the following reaction:

[1] 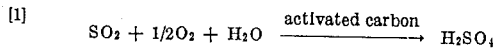

$$SO_2 + 1/2 O_2 + H_2O \xrightarrow{\text{activated carbon}} H_2SO_4$$

The activated carbon having sulfuric acid adsorbed thereon is then contacted at a temperature below 570° F. with hydrogen sulfide to reduce all the adsorbed sulfuric acid and hydrogen sulfide to boh sulfur dioxide and sulfur and subsequently the sulfur which remains adsorbed on the carbon is reacted with hydrogen or a hydrogen forming gas such as methane, to form hydrogen sulfide which is used in the first step of the reaction. This particular process is particularly adaptable to power plants where no readily available source of hydrogen sulfide may be found close by. The process of this invention, however, distinguishes over the process disclosed in Torrence, U. S. Pat. No. 3,563,704, in the aspect that activated carbon adsorbent is regenerated while forming only sulfur dioxide and in another aspect it makes use of a readily available external source of hydrogen sulfide as the reducing gas.

Other dry sulfur dioxide adsorption and regenerating processes using carbonaceous adsorbents include, for example, U. S. Pat. Nos. 2,992,895 and 2,992,065 to Feustel et al., which use an activated char adsorbent and thermal regeneration. Still others, such as U. S. Pat. No. 3,284,158, to Joshwich and Canadian Pat. No. 749,940, to Pijpers use an activated carbon or char and a sulfuric acid reducing gas. However, the process of this invention clearly distinguishes over these patents.

It is a general object of this invention to provide a process for removing sulfur dioxide from waste gas mixtures and recovering a stream of concentrated sulfur dioxide. Another object of this invention is to provide a continuous process for removing sulfur dioxide from gas streams whereby the sulfur oxides are adsorbed onto activated carbon as sulfuric acid and then a portion of the adsorbed sulfuric acid reduced by reaction with the correct proportion of hydrogen sulfide in a reaction that is carried out evenly throughout the reactor. Still another object of this invention is to provide a process for regenerating spent carbon by contacting the carbon with hydrogen sulfide to reduce a portion of the adsorbed sulfuric acid on the activated carbon to sulfur and raising the temperature to recover a concentrated stream of sulfur dioxide. A further object is to provide an activated carbon regeneration process employing a hard granular activated carbon possessing high rate in capacity in characteristics. A still further object is to provide a process for removing sulfur dioxide from gas mixtures thereby permitting the gas stream to pass to the atmosphere free from sulfur oxide pollution. An even further object of this invention is to provide a process for adsorbing and regenerating activated carbon with no carbon burn-off.

Further objects, features and advantages of this invention become more readily apparent from the following disclosure when read in conjunction with the drawings.

SUMMARY OF THE INVENTION

It has been found that sulfur dioxide which is removed from waste gas mixtures by being adsorbed onto activated carbon as sulfuric acid may be recovered without carbon burn-off by contacting the sulfuric acid laden activated carbon with one mole of hydrogen sulfide per three moles of sulfuric acid. The sulfuric acid laden activated carbon is contacted with hydrogen sulfide at a molar ratio of one mole of hydrogen sulfide to three moles of sulfuric acid at a temperature below 350° F., preferably 200° to 350° F., in a homogeneous reaction to reduce all the hydrogen sulfide and a portion of the sulfuric acid to elemental sulfur. This is followed by reacting the sulfur formed in this reaction with the residual sulfuric acid on the activated carbon at a temperature between 350° and 1,000° F. to form a concentrated stream of sulfur dioxide and water vapor without reaction with the carbon. The gaseous sulfur dioxide and water vapor are purged from the reactor and the completely regenerated activated carbon is recycled. Purging the sulfur dioxide is normally done with the hot gas itself, which is at a concentration of 40–50 percent sulfur dioxide. The stream of sulfur dioxide is withdrawn and cooled to remove the water vapor to produce a stream of 80–90 percent by volume sulfur dioxide. The concentrated sulfur dioxide stream may be utilized in a number of ways including feed to a Claus unit to make elemental sulfur, reaction with methane or hydrogen to form hydrogen sulfide, or to make sulfuric acid.

DETAILED DESCRIPTION OF THE INVENTION

Figure 1:
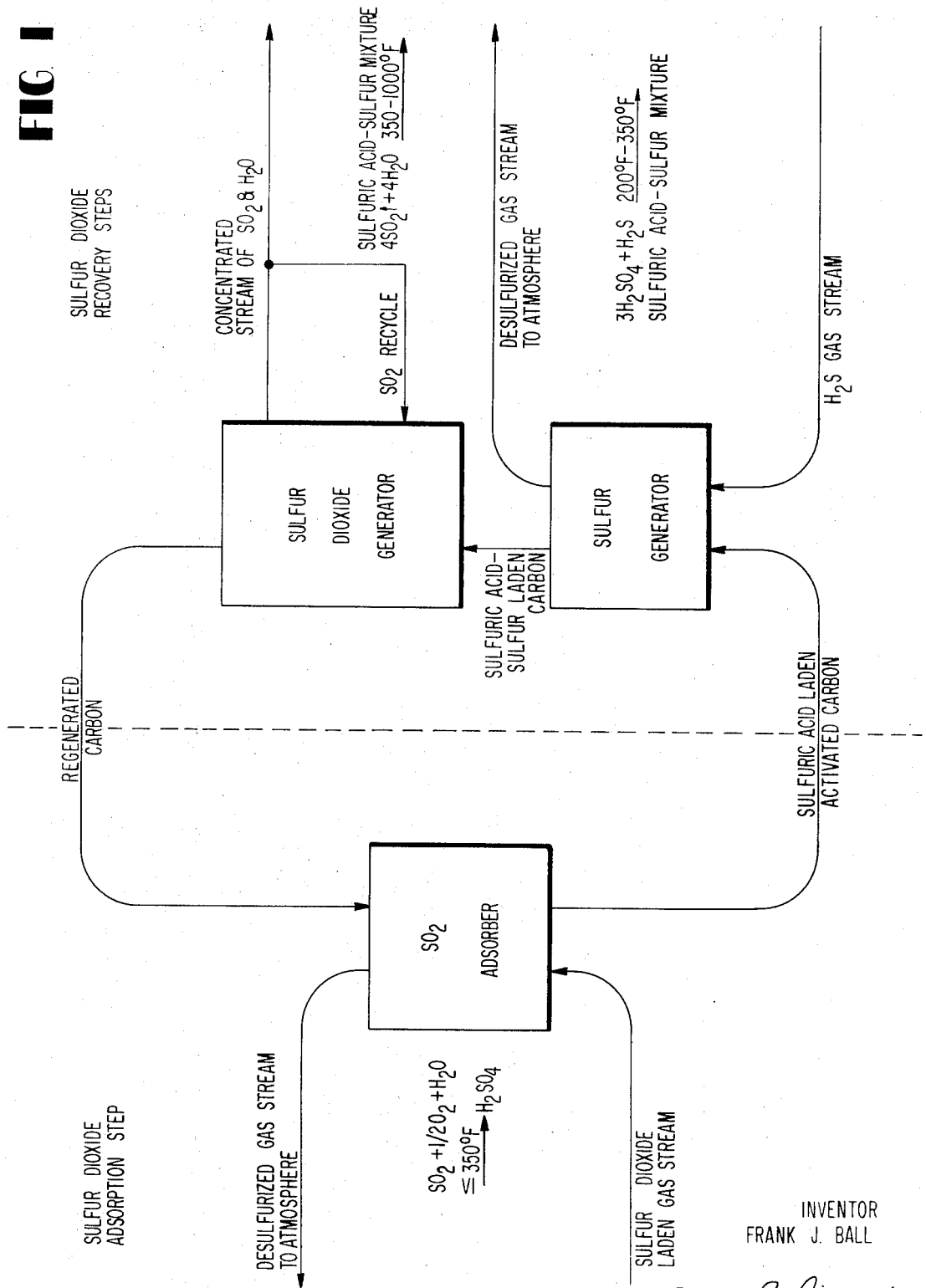
FIG. 1 is a schematic flow diagram of the process of this invention showing its general application.

Referring now to the schematic flow diagram shown in FIG. 1, in the actual practice of this invention a waste gas stream containing sulfur dioxide, typically 0.1–4 percent by volume, is passed at a temperature between ambient temperature and 350° F. in the $SO_2$ Adsorber countercurrent to a continuously moving bed of activated carbon adsorbent. The sulfur dioxide is oxidized on the carbon to $SO_3$ by oxygen in the waste gas stream, and hydrolyzed by water vapor in the stream to sulfuric acid and remains adsorbed on the carbon as shown in reaction [1]. The carbon serves to act as a catalyst in this regard. If the waste gas stream is a flue gas, there is normally available sufficient oxygen and water to oxidize the sulfur dioxide to sulfur trioxide and hydrolyze it to sulfuric acid; however, additional oxygen and water may be added to the gas mixture, if needed. The sulfur dioxide is adsorbed onto the activated carbon as sulfuric acid at gas stream temperatures and the waste gas stream is passed to the atmosphere virtually free of sulfur dioxide. The conversion of sulfur dioxide to sulfuric acid and adsorption onto activated carbon is accomplished by a variety of means such as fixed beds or moving beds; however, the most efficient results are obtained using a fluidized bed.

For coal-based activated carbons, adsorption of sulfur dioxide takes place at temperatures up to about 350° F. and as low as ambient temperatures. The adsorption temperature used will depend on the temperature of the gas stream and adsorbing rate and capacity of the particular carbon. The upper temperature is kept below 350° F. to prevent reaction between adsorbed sulfuric acid and the carbon. The lower sulfur oxide adsorption temperature is kept above its dew point in order to minimize corrosion. The activated carbon may

| | | activated carbon | | |
|---|---|---|---|---|
| [2] | $H_2S + \frac{1}{3}H_2SO_4$ | $\xrightarrow{\text{activated carbon}}$ | $\frac{1}{3}S + \frac{4}{3}H_2O$ | T = 200–350° F. |
| [3] | $\frac{1}{3}S + \frac{8}{3}H_2SO_4$ | $\xrightarrow{\text{activated carbon}}$ | $4SO_2 + \frac{8}{3}H_2O$ | T = 350–1,000° F. |
| [4] | $H_2S + 3H_2SO_4$ | $\xrightarrow{\text{activated carbon}}$ | $4SO_2 + 4H_2O$ | Overall reaction. | typically have 10–25 pounds of sulfuric acid adsorbed thereon per 100 pounds of carbon, but the sulfuric acid loading will depend upon the equipment, carbon and particular conditions used.

The sulfuric acid laden activated carbon is then regenerated by a two-step process, the first step being shown in the diagram as the "Sulfur Generator" followed by the "Sulfur Dioxide Generator." The two regeneration reactions are as follows:

The sulfuric acid laden carbon is reacted with up to one mole of hydrogen sulfide per three moles of sulfuric acid at a temperature between 200° and 350° F. to react all the hydrogen sulfide and only a portion of the adsorbed sulfuric acid to stable elemental sulfur. It is essential for proper performance of this process that reaction [2] be conducted in a homogeneous manner. By homogenity, it is meant that correct proportions of sulfuric acid and hydrogen sulfide are contacted and reacted evenly throughout the reactor. In other words, if reaction [2] is not carried out homogeneously on each carbon granule and within the pores of the granule the following will happen. If insufficient hydrogen sulfide is available to react with the adsorbed sulfuric acid then a portion of the acid reacts with the activated carbon adsorbent upon heating, consuming a portion of the carbon. If excess hydrogen sulfide is present then too much sulfur is formed and upon subsequent heating to effect reaction [3] then all sulfur is not consumed and remains on the activated carbon inhibiting its sulfur dioxide adsorbing capability. It has been found that the homogenity necessary during reaction [2] may be continuously obtained using a fluidized bed sulfur generator.

As stated, reaction [2] is carried out at temperatures below 350° F. to prevent the sulfuric acid from reacting with the activated carbon adsorbed. The exothermic reaction is maintained above 200° F. so that the reaction time will not be excessively long. Because reaction [2] is carried out homogeneously at relatively low temperatures, i.e., below 350° F., the reaction of all the hydrogen sulfide and a portion of the sulfuric acid produces elemental sulfur, thereby substantially eliminating any reaction with the activated carbon adsorbent. One of the advantages of this reaction is that the consumption of hydrogen sulfide is low, being only one-ninth as much as is required to convert all the adsorbed sulfuric acid to elemental sulfur.

Figure 2:
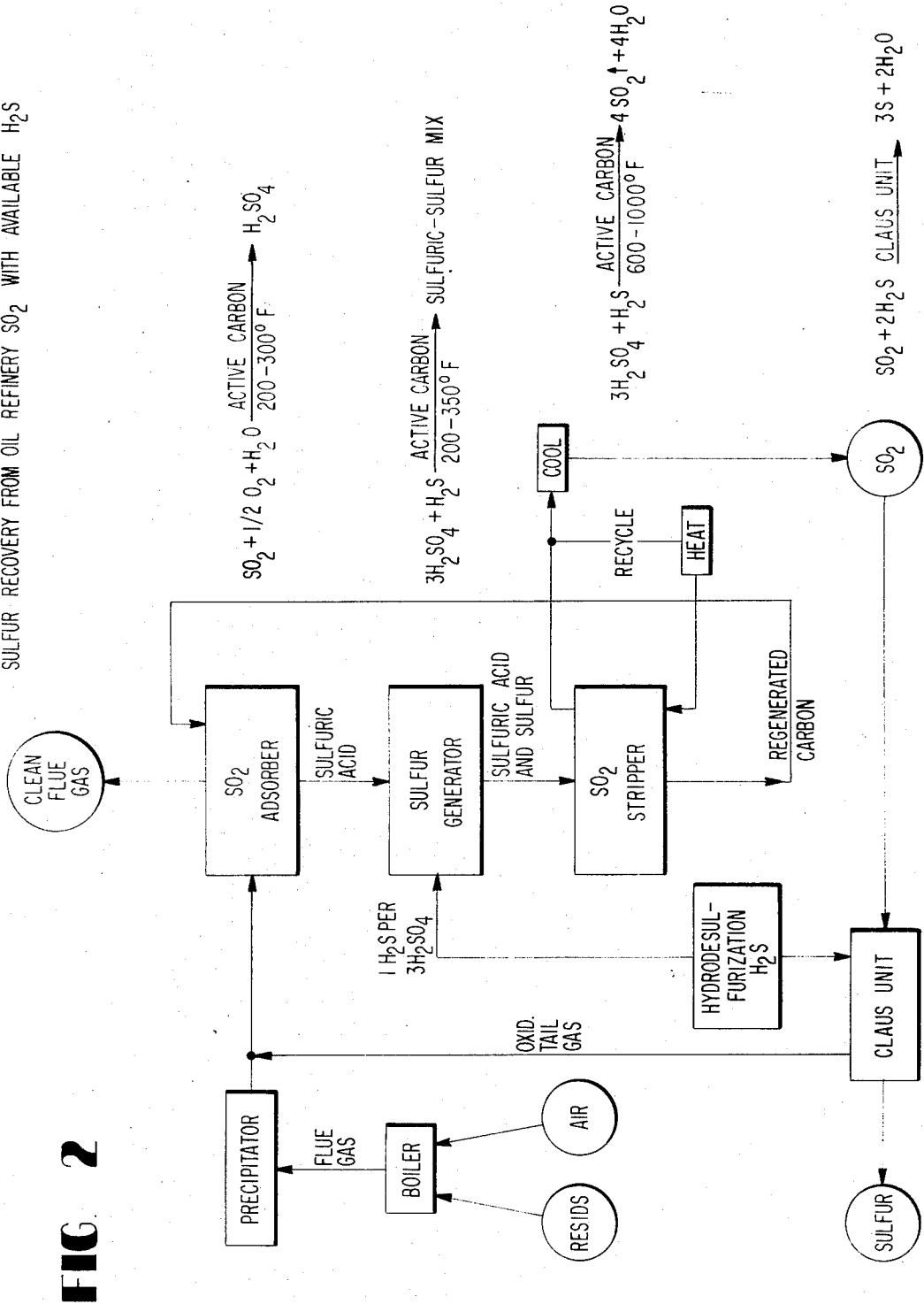
FIG. 2 is a schematic flow diagram showing the process of this invention specifically applied to an oil refinery.

The hydrogen sulfide used in the Sulfur Generator may be produced for example, by reaction of hydrocarbons with sulfur, or it may be obtained from a process gas stream, such as from a hydrodesulfurization process, as more clearly shown in FIG. 2.

The residual unreacted sulfuric acid-sulfur mixture remains adsorbed on the activated carbon. This sulfuric acid-sulfur mixture is then heated to between 350° and 1,000° F. in the Sulfur Dioxide Generator according to reaction [3] to reduce the sulfuric acid and oxidize the elemental sulfur both to sulfur dioxide. When the activated carbon adsorbent is thus heated, a concentrated, i.e., 40–60 percent, stream of sulfur dioxide and water forms according to reaction [3]; whereupon the sulfur dioxide and water vapor are purged from the Sulfur Dioxide Generator. The Sulfur Dioxide Generator may also be a fluidized bed using recycled $SO_2$ as the fluidizing gas.

The 40–60 percent concentrated sulfur dioxide gas stream may be purged by simply blowing the sulfur dioxide-water vapor stream out of the sulfur dioxide generator. A portion of this concentrated stream may be recycled through the sulfur dioxide generator as the fluidizing medium. A portion of the circulating stream of sulfur dioxide equivalent to that being continuously produced by reaction of the sulfuric acid-sulfur mixture on the carbon is withdrawn and cooled to remove the water vapor and produce a stream of sulfur dioxide having a concentration of, say, 80–90 percent. An inert purge gas may be used, if desired.

The concentrated sulfur dioxide stream may be put to a variety of uses depending upon the location of the process. For example, the process in one aspect may be applied to a oil refinery having available hydrogen sulfide. This aspect is set forth more clearly in FIG. 2. In FIG. 2 the sulfur dioxide stream is fed to a Claus unit and reacted to form elemental sulfur. Hydrogen sulfide is supplied to the sulfur generator from the hydrodesulfurization process. Alternatively, hydrogen sulfide may be formed by reacting the sulfur dioxide stream with hydrogen or a hydrogen forming gas. In still another alternative a fraction of the dilute sulfur dioxide containing flue gas stream may be reduced with natural gas to form the required hydrogen sulfide.

Upon recovery of the sulfur dioxide stream, the activated carbon adsorbent is in condition for recycling to the $SO_2$ adsorber. It does not need to be heated to higher temperatures, i.e., 1,000° F. to regain adsorbing capacity as is necessary when elemental sulfur is stripped directly from activated carbon. Any activated carbon adsorbent may be used in the process of this invention as long as it has sufficient rate and capacity characteristics to adsorb sulfur dioxide without making the equipment unduly large and burdensome. Bituminous coal-based activated carbons have been found to be especially successful. Because the process of this invention does not consume carbon and because the carbon has high adsorbing rate and capacity characteristics, the throughput of sulfur dioxide containing gas per volume of carbon is significantly increased over the throughput of chars. This achievement means a significant reduction in the size of the adsorption equipment required by sulfur dioxide recovery processes.

The practice of this invention may clearly be seen in the following example.

To illustrate the applicability of this two-step process, two samples of a bituminous coal-based activated carbon were loaded with about 11 pounds of sulfuric acid per 100 pounds of carbon by contacting the activated carbon adsorbent with a gas mixture containing $SO_2$, $O_2$ and water vapor at a temperature of about 260° F. according to reaction [1]. The sulfuric acid laden activated carbon was reacted with hydrogen sulfide in a fluidized bed at the conditions shown in the table below to effect reaction [2].

REACTION CONDITION FOR REACTING SPENT ACTIVATED CARBON WITH $H_2S$ IN A FLUIDIZED BED ACCORDING TO REACTION [2]

| Run No. | Inlet Acid Loading, Lbs. $H_2SO_4$/100 Lbs. | Carbon Feed Rate/ lbs./hr. | Bed Temp, °F. | Volume % Concentration of $H_2S$ Inlet | Outlet |
|---|---|---|---|---|---|
| 1 | 11.0 | 46 | 180–220 | 2.3 | 0.6 |
| 2 | 11.2 | 46 | 270–310 | 1.7 | 0.3 |

The effluent gas stream was measured for $SO_2$. No sulfuric acid was lost as $SO_2$ in Run 1, and only three percent of the adsorbed sulfuric acid was lost as $SO_2$ in Run 2.

To effect reaction [3] the carbons from both runs were heated to 600° F. in a fixed bed reactor. Detectable $SO_2$ began evolving when the temperature reached 370° F. A check of the material balances for both runs showed 96 percent conversion to sulfur dioxide in Run 1, and 94 percent conversion in Run 2. The somewhat lower figure for Run 2 was expected because some of the sulfuric acid was lost during reaction [2]. This example illustrates the preciseness which is possible to satisfactorily accomplish the overall results of reaction [4].

While the invention has been described and illustrated herein by references by various specific materials, procedures and examples, it is understood that the invention is not restricted to a particular materials, combinations of materials and procedures selected for that purpose. Numerous variations of such details can be employed as will be appreciated by those skilled in the art.

Having thus described the invention, what is claimed is:

1. A process for regenerating a sulfuric acid laden activated carbon which comprises;
    a. reacting the sulfuric acid laden activated carbon homogeneously with the hydrogen sulfide at a mole ratio of one mole hydrogen sulfide per 3 moles sulfuric acid at a temperature between 200° and 350° F. to reduce all of said hydrogen sulfide and a portion of said sulfuric acid to elemental sulfur,
    b. heating the sulfuric acid-sulfur mixture at a temperature between 350° and 1,000° F. to form sulfur dioxide, and
    c. purging said sulfur dioxide from said activated carbon adsorbent.

2. The process of claim 1 further comprising,
    d. recycling said activated carbon adsorbent to adsorb additional amounts of sulfur dioxide.

3. The process of claim 1 wherein said activated carbon is a bituminous coal-based activated carbon.

4. The process of claim 1 wherein step (a) is conducted by a fluidizing gas.

5. The process of claim 1 further comprising (e) recycling at least a portion of said purged sulfur dioxide for use as a fluidizing gas in step (b).

6. The process of claim 1 wherein at least a portion of said purged sulfur dioxide is reacted with a hydrocarbon to form hydrogen sulfide.

7. The process of claim 6 wherein a portion of the hydrogen sulfide produced is used in step (a).

8. The process of claim 1 wherein at least a portion of said purged sulfur dioxide is reacted with hydrogen sulfide to form elemental sulfur.

9. A process for removing sulfur dioxide from a sulfur dioxide, oxygen and water vapor containing waste gas stream which comprises;
   a. contacting said sulfur dioxide, oxygen and water vapor containing gas stream with an activated carbon adsorbent at a temperature between ambient temperature and 350° F. to form sulfuric acid adsorbed onto said activated carbon,
   b. reacting the sulfuric acid laden activated carbon homogeneously with hydrogen sulfide at a mole ratio of up to one mole hydrogen sulfide per three moles sulfuric acid at a temperature between 200° and 350° F. to reduce all of said hydrogen sulfide and a portion of said sulfuric acid to elemental sulfur,
   c. heating said sulfuric acid-sulfur mixture to a temperature between 350° and 1,000° F. to form sulfur dioxide, and
   d. purging said sulfur dioxide from said activated carbon adsorbent.

10. The process of claim 9 further comprising, reacting a portion of said waste gas stream with natural gas to form hydrogen sulfide for use in step (b).

* * * * *